Aug. 13, 1963  H. SCHILL  3,100,515
MACHINE FOR SKINNING AND CUTTING MEAT AND BACON SIDES
Filed Sept. 2, 1959  8 Sheets-Sheet 6
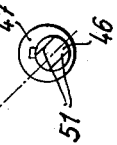
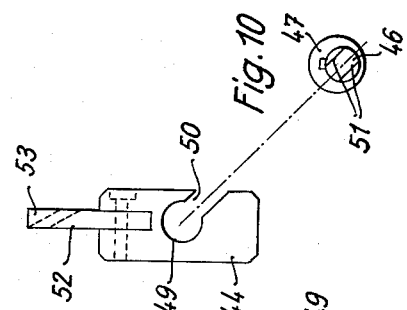
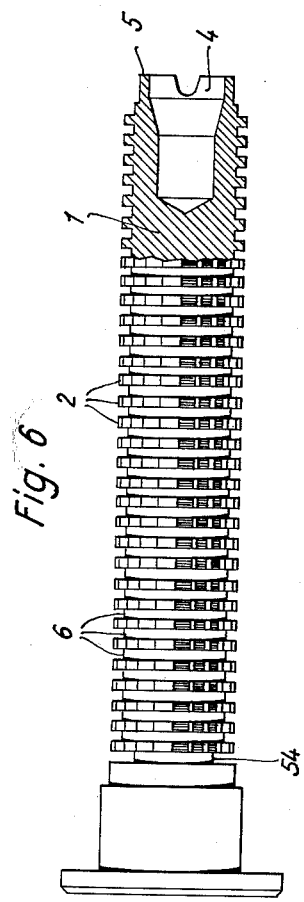
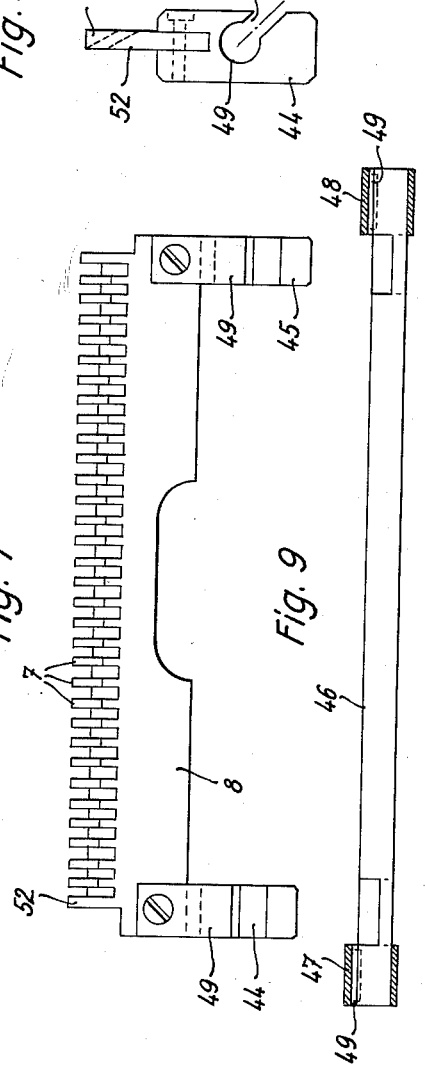
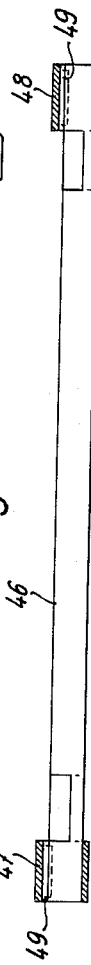
Inventor
Herman Schill
by Michael S. Striker
Attorney

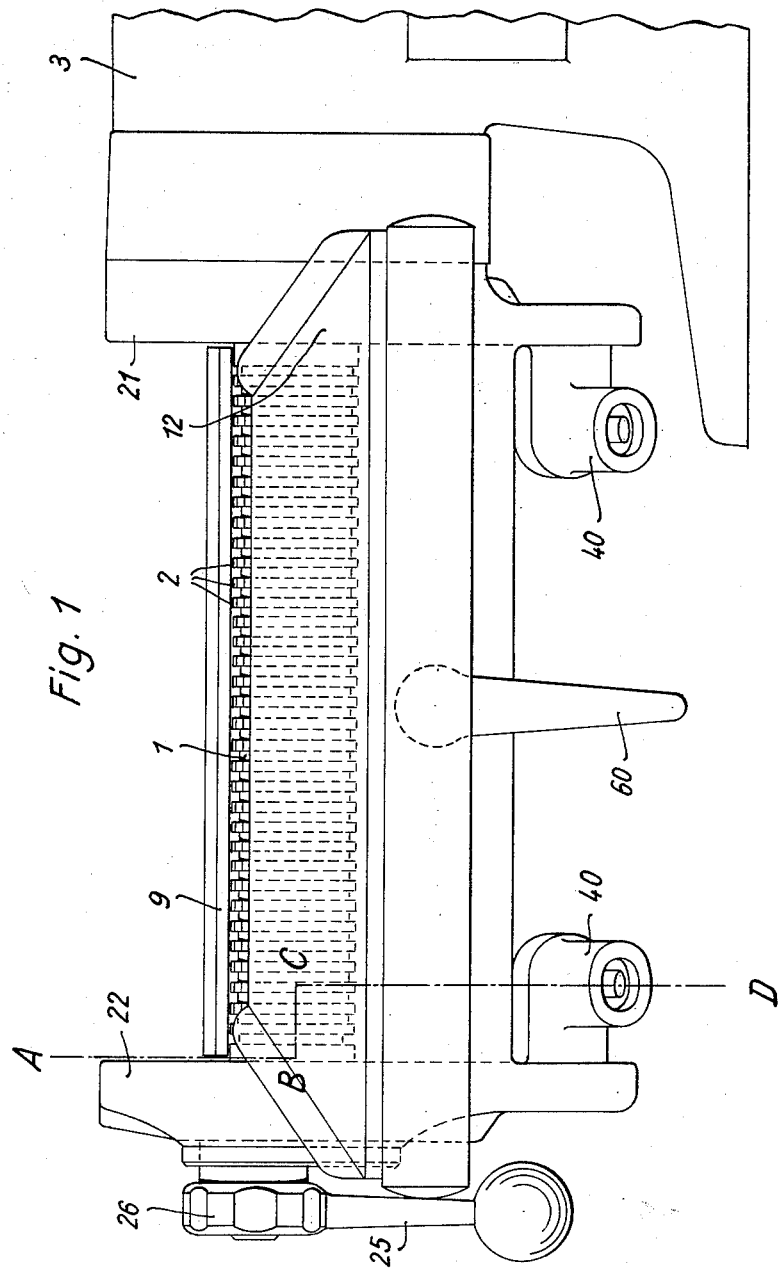

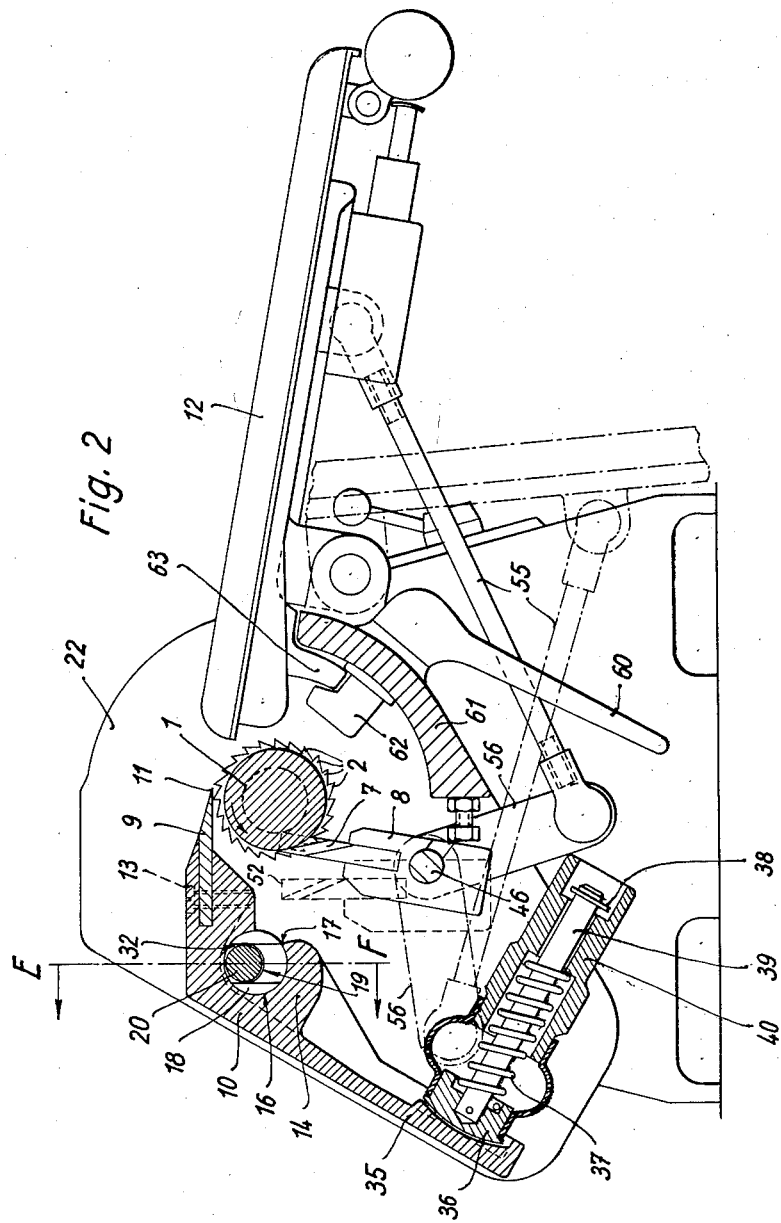

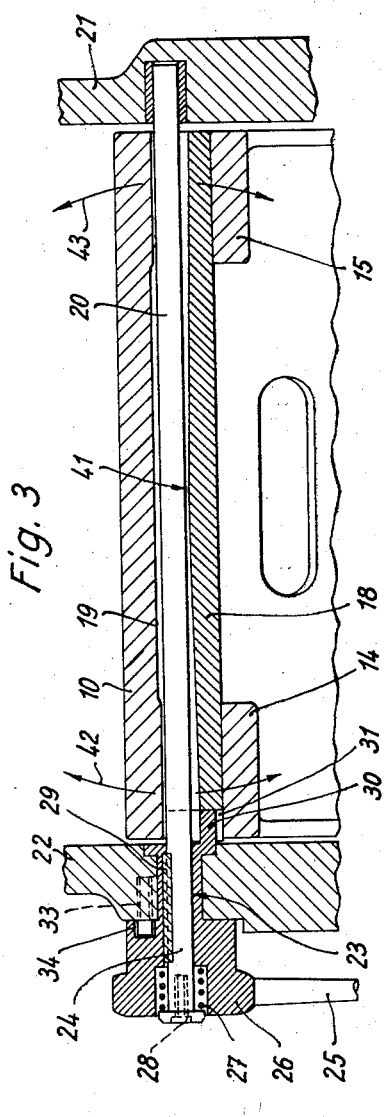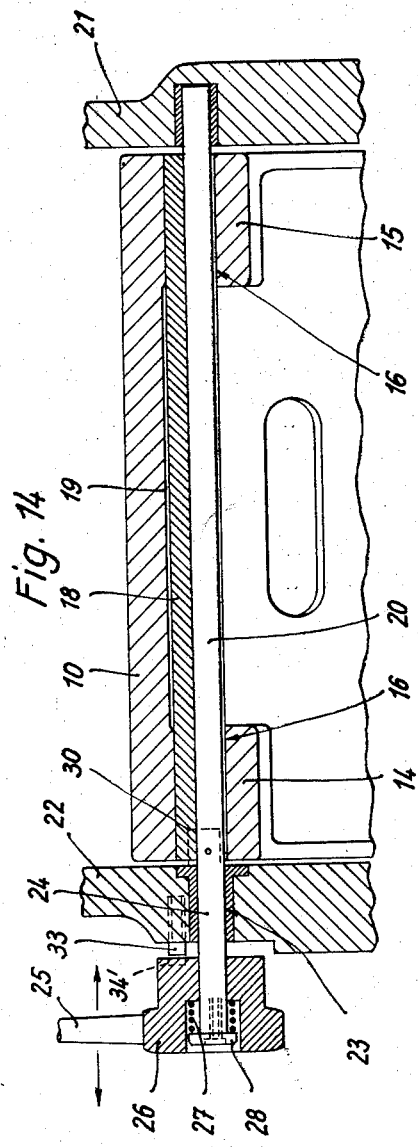

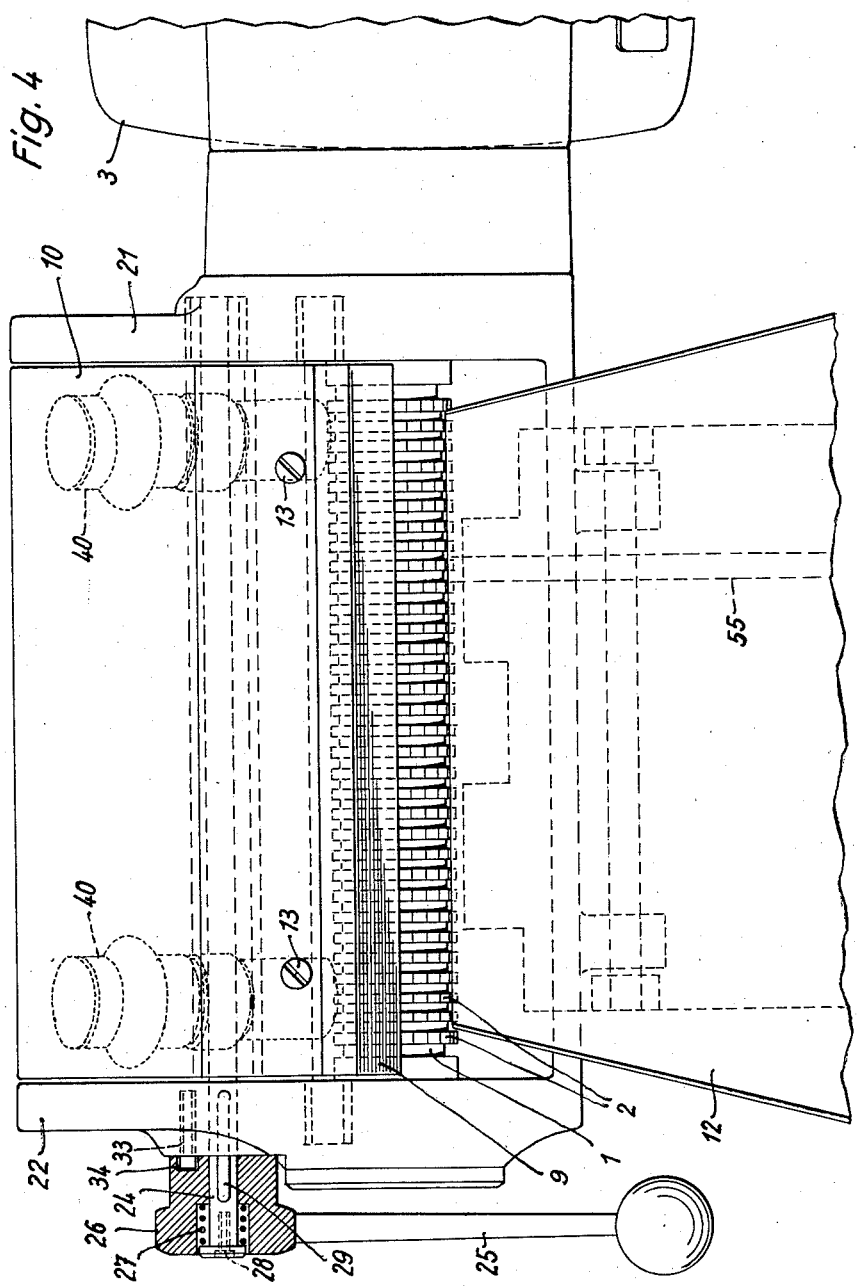

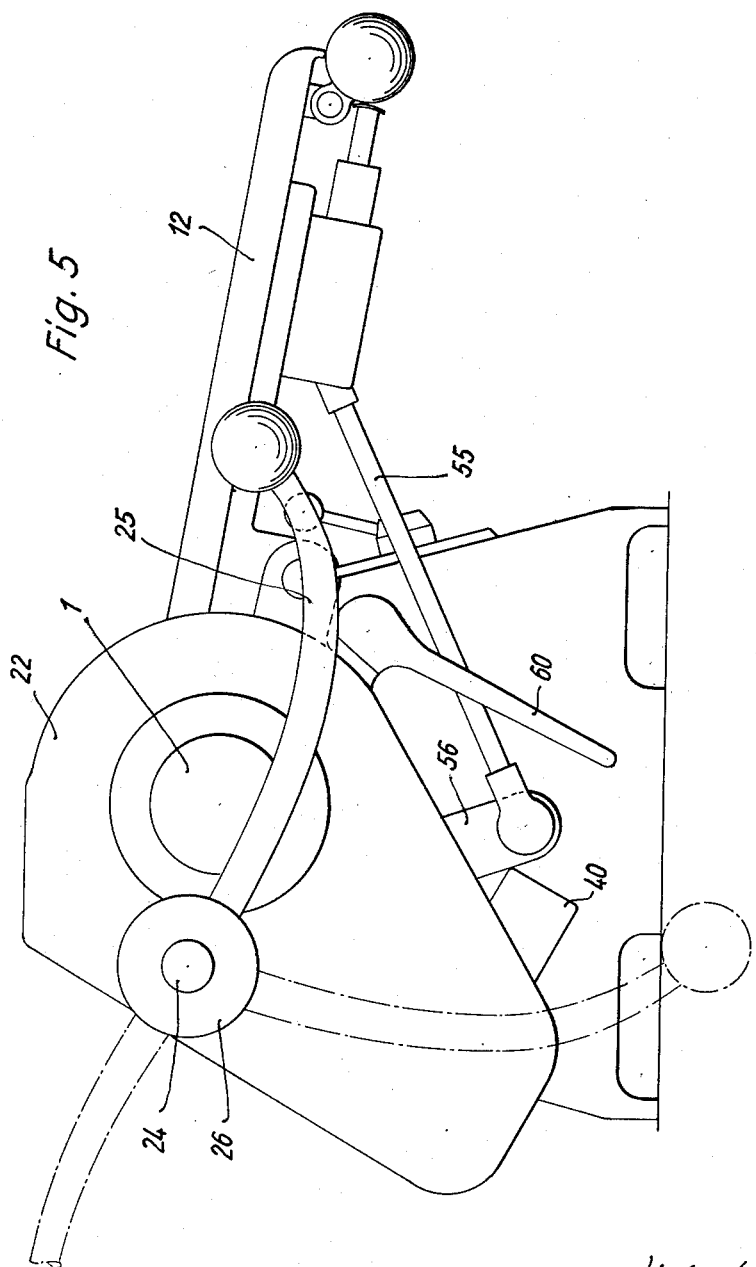

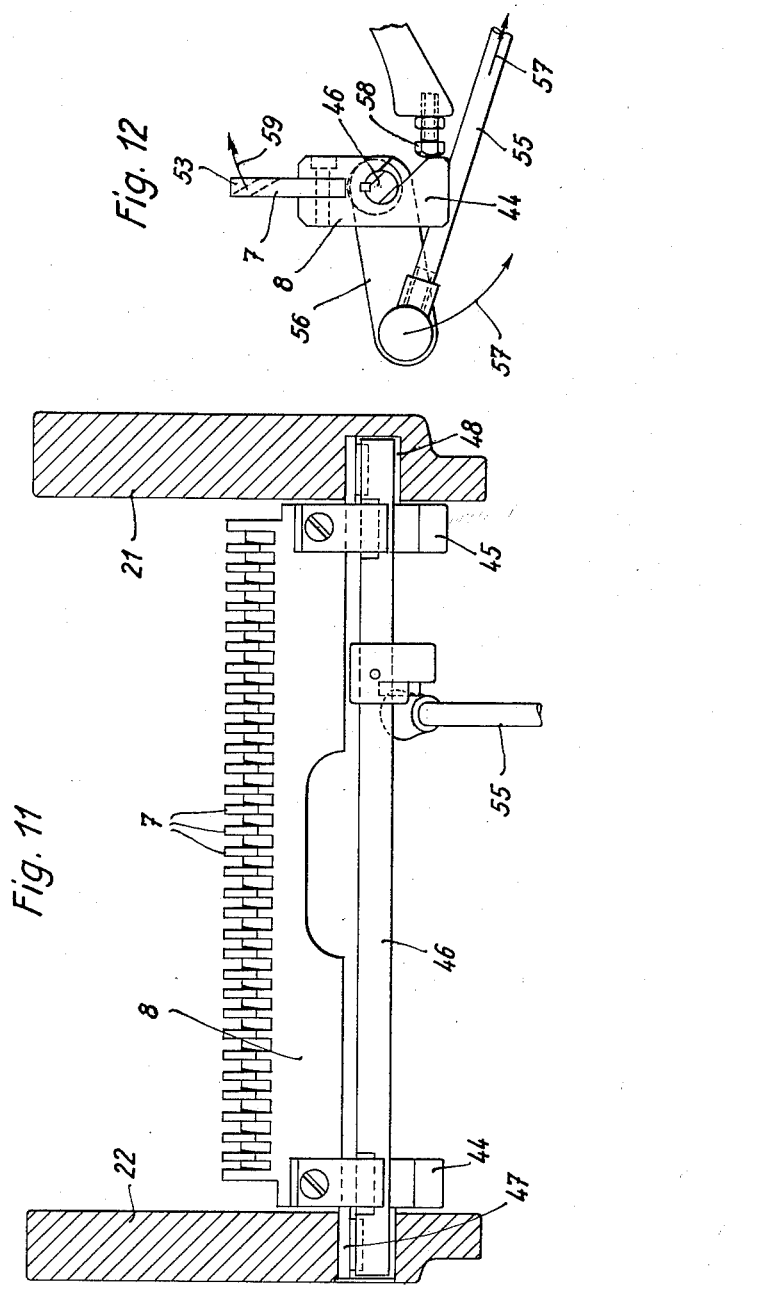

Aug. 13, 1963 H. SCHILL 3,100,515
MACHINE FOR SKINNING AND CUTTING MEAT AND BACON SIDES
Filed Sept. 2, 1959 8 Sheets-Sheet 8
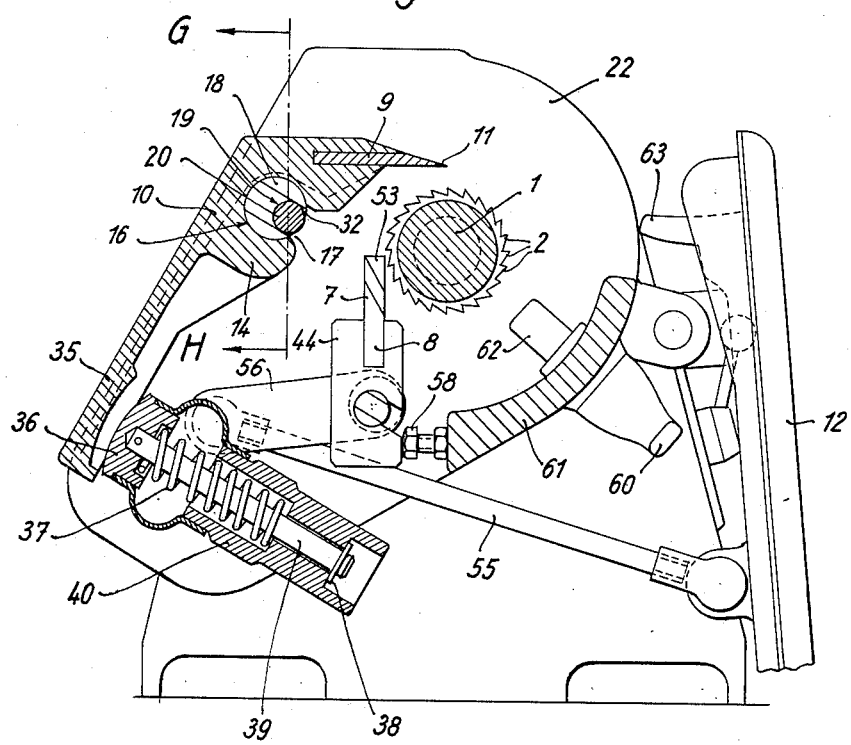
Inventor
Herman Schill
by Michael S. Striker
Attorney United States Patent Office 3,100,515
Patented Aug. 13, 1963

3,100,515
MACHINE FOR SKINNING AND CUTTING MEAT AND BACON SIDES
Hermann Schill, Goldscheuer, near Offenburg, Baden, Germany
Filed Sept. 2, 1959, Ser. No. 837,736
Claims priority, application Germany Sept. 3, 1958
17 Claims. (Cl. 146—130)

The invention relates to a machine for skinning the rind or skin of bacon and meat and/or cutting meat and bacon sides.

The machine according to the invention is of the type comprising a rotatable feed roll which is equipped on its surface with a plurality of teeth gripping the rind or skin of the object to be skinned, and having a skinning blade with a cutting edge which points toward the apex of the feed roll, the skinning blade being adjustable toward or away from the feed roll and releasable from the machine to be withdrawn therefrom together with its holder.

Skinning machines of this type are known per se. In these machines, however, the disadvantage is inherent that the withdrawal of the skinning blade together with its holder cannot be accomplished in a manner so simple as it is desired in practice. Above all, no construction has become known wherein the feed roll is on at least one of its ends appreciably exposed after the blade holder has been removed to be able to clean a large area of the feed roll in a particularly convenient manner.

In order to comply with the above-mentioned requirements as well as possible, the invention provides a machine which comprises a rotatable feed roll provided on its surface with a plurality of teeth engaging in the rind or skin of the object to be skinned carried along by the engagement of the teeth, a skinning blade with a cutting edge arranged to point toward the apex of the feed roll, a holder carrying the skinning blade, said skinning blade together with its holder being arranged so as to be releasable from the machine, means for adjusting the skinning blade together with its holder toward or away from the feed roll, said means comprising an adjusting lever associated with the blade holder and movable through an adjustment path and into a further position outside of its adjustment path serving to adjust the skinning blade together with its holder toward or away from the feed roll, and where the skinning blade together with its holder is released to be withdrawn from the machine.

This construction has the advantage that the adjusting lever serves at the same time as disengaging lever of the blade holder. Thereby the release of the blade holder to be withdrawn is rendered particularly simple. This is attained since the adjusting lever, serving for displacing the skinning blade toward or away from the feed roll, opens the mounting of the blade holder as soon as the lever is brought into the above-mentioned further position so that the blade holder can be removed from its mounting by a single manipulation without the necessity to unscrew or remove screws or the like. This facilitates not only the cleaning of the machine, but also the replacing of the skinning blade in the holder. In this connection it is even intended to impart a reciprocating cutting movement to the blade. If desired, such a blade can be also employed in an additional attachment to the machine cutting sides of meat or bacon.

The skinning blade reciprocating in its longitudinal direction can be driven by a separate small motor associated with the skinning blade and carried by the disengageable blade holder. However, the skinning blade can also immediately be operated to move to and fro by the feed roll conveying the object to be cut or skinned. For this purpose a sinuous groove may be provided, for example, at one end of the feed roll around the circumference thereof, which groove is engaged by a finger fixed laterally of the skinning blade so as to impart a reciprocating cutting movement to this blade, as desired.

A further improvement in the machine according to the invention is attained when the skinning blade as well as its holder is not only capable of yielding parallel to the feed roll, but when the blade can also perform a movement transversely to its horizontal plane. As a result, the skinning blade can also adjust itself inclined with respect to the horizontal plane of the feed roll in case the thickness of the object to be skinned is unequal in width, i.e. if one side thereof is somewhat thicker than the other side, or in case individual thick portions exist which can now be yieldingly followed by the skinning blade without difficulty.

The known skinning machines are usually provided with a device for stripping off the rind or the like held by the teeth of the feed roll. According to another feature of the invention, this stripping device is made withdrawable to be cleaned in a manner as simple and easy as the skinning blade together with its holder.

Several preferred embodiments of the invention will now be described by way of example and with reference to the accompanying drawings, in which:

FIG. 1 is a front elevational view of a skin and rind removing machine according to the invention;

FIG. 2 is a vertical section through the machine of FIG. 1 taken on the line A—B—C—D of FIG. 1, the skinning blade being adjusted to remove the rind or skin;

FIG. 3 is a partial section taken on the line E—F of FIG. 2;

FIG. 4 is a top plan view of the machine;

FIG. 5 is a side view as seen from that side of the machine which is provided with an adjusting lever;

FIG. 6 is an elevational view of the feed roll of the machine;

FIG. 7 is an elevational view of the stripping plate for the feed roll;

FIG. 8 is a side view of the stripping plate;

FIG. 9 is an elevational view of the eccentrically mounted shaft for the stripping plate;

FIG. 10 is an end view of the shaft for the stripping plate with the eccentric bearing seated on the shaft;

FIG. 11 is an elevational view of the stripping plate and its shaft mounted in the machine;

FIG. 12 is an end view of the stripping plate and its shaft, showing the lever mechanism for the actuation of the stripping plate;

FIG. 13 is a view similar to FIG. 2, but showing the table in lowered position and the stripping plate released to be withdrawn, the adjusting lever, not shown in this figure, being in such a position as serves for the withdrawal of the blade holder; and FIG. 14 is a partial section taken on the line G—H of FIG. 13.

The rind and skin removing machine shown in the drawings comprises a feed roll 1 provided with teeth 2 and driven by a motor 3 which rotates a shaft (not shown) fitted with a suitable transmission and engaging in a recess 4 provided in the inner face 5 of the feed roll 1, the shaft driving the feed roll 1 in the desired direction of rotation and at the desired speed of rotation.

The teeth 2 of the feed roll 1 are constructed and arranged like the teeth of a saw blade and act in such a manner that they seize and carry along the material in the direction of rotation indicated by an arrow in FIG. 2. A plurality of spaced toothed rims is formed by the teeth on the feed roll, a groove 6 being left between adjacent toothed rims. The grooves 6 are engageable by teeth 7 of a stripping plate 8 serving to strip off the material from the feed roll 1 and to clean said feed roll at the same time.

Cooperating with the feed roll 1 is a skinning blade 9 having a cutting edge 11 and carried by a holder 10. This skinning blade 9 may be so adjusted that the cutting edge 11 thereof points toward the apex of the feed roll 1. The feed roll 1 rotates toward the cutting edge 11 of the skinning blade 9. The object from which the rind or the skin is to be removed and which is fed on a table 12, is carried along by the teeth 2 of the feed roll 1 in the direction of rotation of the roll. If the skinning blade 9 is so adjusted that only the skin or rind of the object passes thereunder, the remaining portion of the object to be skinned is separated from the skin or rind by the cutting edge 11 of the skinning blade 9 and passes thereover.

However, if the holder 10 and the skinning blade 9 with its cutting edge 11 are so adjusted that the cutting edge 11 projects a predetermined distance beyond the apex of the feed roll 1, the portion passing under the skinning blade and skinned by the cutting edge thereof from the object seized by the teeth 2 of the feed roll 1, will be correspondingly thicker. In this case meat or bacon of any desired thickness will remain on the skin or rind removed. When the skinning blade, however, is set back so that the cutting edge 11 is approximately positioned above the apex of the feed roll 1, only rind is removed from the object to be skinned.

In the intermediate positions of the skinning blade 9 between the positions described above, it is possible to attain in an infinitely variable manner that meat or bacon of any desired thickness remains on the skin or rind.

In order to enable the skinning blade 9 to be set, the holder 10, into which the skinning blade 9 is inserted and in which it is secured by means of screws 13, has two lateral bearing lugs 14 and 15 as shown in FIG. 3. Each of said lugs is provided with an axial bore 16 which, through the intermediary of a slot 17 in the lug, opens in inward direction (FIG. 2).

A hollow shaft 18 is mounted in the bores 16 so as to be rotatable about its longitudinal axis in relation to the holder 10. The hollow shaft 18 has an eccentrically arranged bore 19 and is seated on a shaft 20 mounted in lateral supporting walls 21 and 22 of the machine. The shaft 20 extends through a bearing bore 23 arranged in the supporting wall 22 and has an outwardly protruding end 24 which carries an adjusting lever 25 having a hub 26 slipped on to the protruding end 24 of the shaft 20. The hub 26 is so arranged as to be axially displaceable on the protruding end 24 of the shaft 20 against the action of a helical pressure spring 27 located in a bore formed in hub 26 and closed by a cap screw 28 which is screwed into the face of the end 24 of the shaft 20. The hub 26 is connected to the shaft 20 by means of a key 29 in such a manner that each swinging movement of the lever 25 is transmitted as a rotating movement to the shaft 20. A clutch cam 30 is secured to the shaft 20 and engages in a lateral recess 31 in the hollow shaft 18 so that the hollow shaft 18 is also turned by swinging the lever 25. Due to the arrangement of the shaft 20 in the bore 19 and, due to the eccentricity of the bore 19 in the hollow shaft 18, it is therefore possible to effect an infinitely variable setting of the holder 10 with the skinning blade 9, which infinitely variable setting is necessary for removing the skin or rind with or without meat or bacon thereon from the object to be skinned. As shown in FIG. 2 of the drawings, the skinning blade 9 is advanced in relation to the feed roll 1 when it is intended to separate the skin or rind with meat or bacon thereon, whereas, when separating the skin or rind without meat or bacon thereon, the skinning blade 9 assumes a retracted position. See also the different positions of the lever 25 in FIG. 5.

A slot 32 radially opens bore 19 of the hollow shaft 18 to one side thereof. When the hollow shaft 18 is turned by turning the shaft 20 by means of the lever 25 in such a manner that the position of the slot 32 corresponds to that of the slot 17, the holder 10 together with the skinning blade 9 can be disengaged from the shaft 20. This position of the parts mentioned is shown in FIG. 13.

In order to ensure that the adjusting lever 25 may normally not be moved into the position where the holder 10 is capable of being disengaged from the shaft 20, the lateral supporting wall 22 is provided with a plug 33 projecting therefrom. This plug 33 engages in an arcuate notch 34 in the hub 26. This arcuate notch 34 is arranged coaxial with the shaft 20 and has its length so chosen that end stops are formed for the plug 33, which stops limit the swinging movements of the lever 25. Only when the hub 26 together with the lever 25 has been withdrawn from the plug 33 against the action of the spring 27, it is possible to continue turning of the lever 25 so as to bring the hollow shaft 18 into the position of release shown in FIG. 13. To fix the lever 25 in this position, a locking recess $34^1$ is provided for the plug 33 in the inner surface of the hub 26.

As described above, the adjusting lever 25 may be moved into three different positions, namely the last mentioned position where the holder 10 for the blade 9 is capable of being disengaged from the shaft 20 and those positions where, on the one hand, the separation of skin or rind without meat or bacon thereon takes place and, on the other hand, skin and rind are separated with meat or bacon thereon. After the holder 10 together with the skinning blade 9 has been inserted it suffices to turn the hub 26 or the adjusting lever 25 until the plug 33 can snap into the arcuate notch 34. Thereupon, the machine is able to work again and the skinning blade 9 is selectively adjustable from a position where the skin or rind is separated with meat or bacon thereon to a position where the skin and rind is separated without meat or bacon thereon. Thus, the skinning blade 9 can be adjusted to each intermediate position in an infinitely variable manner by simply turning the adjusting lever 25.

The blade holder 10 has a downwardly extending prolongation 35 bearing on either side of the machine against a stop 36 which is pressed against this prolongation by the action of a strong helical pressure spring 37. Upon adjusting the blade holder 10 to fine skinning and to severing skin or rind with meat and bacon adhering thereto, the spring 37 is tensioned accordingly since the prolongation 35 of the holder 10 is displaced to the right-hand side in FIG. 2. The spring 37 allows the skinning blade 9 to yield when the object to be skinned makes this necessary. When the holder 10 has been disengaged, movement of the stop 36 under the influence of the spring 37 towards the left, as viewed in FIG. 2, is limited by the engagement of the disc 38 fixed to the free end of the spring bolt 39 with an abutment face on member 40 in which the bolt 39 is slidably mounted.

The spring 37 on either side of the machine permits yielding of the skinning blade 9 in upward direction to avoid overstraining of said blade. However, sometimes it is desirable that the skinning blade be arranged to yield only at one side of the machine, if the rind of the object to be skinned is somewhat thicker on one side than on the other side. To accomplish this in the machine according to the invention the skinning blade 9 is also capable of yielding in such a manner that it can tilt some millimeters upwardly and downwardly about a horizontal axis located in its middle portion so that it is not only movable parallel to the feed roll 1, but can also assume a position somewhat inclined to the axis of the feed roll 1. For this purpose the bore 19 in the hollow shaft 18 is so designed that the shaft 20 mounted in the bore 19 rests ony on a central raised portion 41 of the lower part of the hollow shaft 18, whereas a small clearance of a few millimeters remains between the shaft 18 and the shaft 20 on either side of the central portion 41 (see FIG. 3). As already mentioned, this enables the shaft 20, the holder 10 and the skinning blade 9 which are normally positioned parallel to the feed roll, to adapt themselves to differing rind thicknesses in that the shaft 20 is able to tilt about the central raised portion 41 in the hollow shaft 18, as indicated by arrows 42 and 43 in FIG. 3.

The stripping plate 8 shown in FIGS. 7 and 11 and cooperating with the feed roll 1 is also arranged to be removable from the machine. This stripping plate 8 has two lateral holding pieces 44 and 45 carried by a shaft 46 which is mounted in the lateral supporting walls 21 and 22 of the machine by means of eccentric bearing bushings 47 and 48. The holding pieces 44 and 45 are each provided with a bore 49 accommodating the shaft 46 and having each an outwardly opening slot 50 communicating with the bore 49. At the places where the holding pieces 44 and 45 are seated on the shaft 46, the shaft 46 is provided with two parallel surfaces 51 spaced from each other a distance substantially equal to the width of the slot 50 so that the stripping plate 8 can be disengaged from the shaft 46 when the surfaces 51 and the slot 50 assume positions corresponding one to another. The stripping plate 8 can then readily be withdrawn and inserted again. In order to ensure that the teeth 7 of the stripping plate 8 automatically engage exactly in the groves 6 of the feed roll 1 when inserting the stripping plate, this latter plate is provided with an end tooth 52 forming at its free end a tapered guide portion 53 (FIG. 8) automatically engaging in a deeper groove 54 in the feed roll 1 and thereby automatically centering the stripping plate 8 into its exact position.

The engagement and the release of the stripping plate 8 are automatically effected by the feed table 12 in such a manner that the stripping plate 8 is automatically swung toward the feed roll 1 to engage it, when the feed table 12 is brought into its operative upper position, and is automatically released from the feed roll 1, when the feed table 12 is in its lower position and the machine out of operation. For this purpose a rod lever 55 is at one of its ends articulated to the underside of the feed table 12 and at its opposite end pivotally connected to one of the ends of a lever 56 the other end of which is rigidly connected with the shaft 46. When moving the table in downward or upward direction, the levers 55 and 56 are actuated and turn the shaft 46 and therewith the holding pieces 44 and 45, the bores 49 of which frictionally engage the shaft 46, in such a manner that the stripping plate 8 engages the feed roll 1 when the table 12 is lifted, as shown in FIG. 12 and illustrated by arrows 57. In order to ensure that the stripping plate 8 accomplishes the desired swinging movement, an adjustable stop screw 58 is provided at the frame of the machine. This stop screw 58 is engaged by the holding piece 44 which thereby performs a movement in the direction of arrow 59, when the levers 55 and 56 are being moved in the direction of the arrows 57 during the lifting of the feed table 12. When the feed table 12 is lowered, just a reverse movement of the levers 55 and 56 as well as of the stripping plate 8 or its holding piece 44 takes place. After the table has been swung down, the shaft 46 will occupy the position in which the stripping plate 8 can be disengaged from and engaged with the shaft 46, as described above. The locking of the raised feed table 12 is effected by a turnable lever 60 engaging with a locking projection connected thereto and located at the inner side of a wall 61 behind a locking nose 63 arranged on the underside of the feed table and thereby holding the feed table in its slightly inclined working position.

It may be mentioned that the front edge of the feed table is arranged a small distance apart from the feed roll 1 so that the object to be skinned is seized by the teeth 2 of the feed roll in a region which is sufficiently distant from the apex of the feed roll, a satisfactory carrying along of the object by the roll being thereby ensured even when the machine is adjusted to separate skin or rind with meat or bacon adhering thereto with the blade in advanced position.

The straight edge skinning blade may also be exchangeable against a skinning blade having triangular teeth like the blade of a harvester to attain a pulling cut. Similarly, in lieu of a stationary blade an exchangeable blade might be used performing a reciprocating cutting movement, in case that would be more advantageous in view of specific qualities of the object to be skinned and in case it is intended to cut exclusively meat or bacon slides. The reciprocating cutting movement of this blade might be effected by a relatively simple gearing, the feed roll 1 being for this purpose provided with a sinuous groove extending around its circumference. Similarly, also a small separate driving motor may be used. In these cases, it is merely necessary for the skinning blade to be capable of being displaced to and fro in its holder in the longitudinal direction thereof.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A machine for skinning and cutting meat and bacon sides, comprising a rotatable feed roller provided on its surface with a plurality of teeth engaging in the rind or skin of the object to be skinned carried along by the engagement of the teeth, a skinning blade with a cutting edge arranged to point toward the apex of the feed roller, a holder carrying the skinning blade and having bores, said skinning blade together with its holder being arranged so as to be releasable from the machine, means for adjusting the skinning blade together with its holder toward or away from the feed roller, said means comprising an adjusting lever, a supporting shaft connected to said lever, and a hollow shaft mounted in said bores of said holder and having an eccentric bearing bore receiving said supporting shaft and having a radial slot for detachment of said hollow shaft from said supporting shaft, said adjusting lever being movable through an adjustment path serving to adjust the position of the cutting edge of the skinning blade in a plane substantially tangential to the periphery of said feed roller, and having a further position where the skinning blade together with its holder is released to be withdrawn from the machine.

2. Machine as claimed in claim 1, wherein the hollow shaft provided with the eccentric bore has a clutch cam and a recess at one of its ends through the intermediary of which cam and recess the hollow shaft is operatively connected to the adjusting lever.

3. A machine for removing skin from an object comprising, in combination, a frame; a driven roller mounted on said frame for rotation about an axis and having a peripheral skin-gripping surface; a skinning blade having an edge portion bounded by a cutting edge, said edge portion and said cutting edge being located in close proximity with said skin-gripping surface and forming a gap with the same; a holder means movably mounted on said frame spaced from said roller and carrying said blade; and resilient means biasing said holder means to move with said blade in such a direction that the width of said gap is reduced whereby in said gap the skin of an object is pressed against said skin-gripping surface so that the skin is transported by said roller through said gap and cut from the remainder of the object.

4. A machine for removing skin from an object comprising, in combination, a frame; a driven roller mounted on said frame for rotation about an axis and having a peripheral skin-gripping surface; a skinning blade having an edge portion bounded by a cutting edge, said edge portion and said cutting edge being located in close proximity with said skin-gripping surface and forming a gap with the same; a feeding table having a forward end located adjacent said skin-gripping surface spaced in circumferential direction of said roller from said cutting edge so that an object moved beyond said forward end is first gripped by said skin-gripping surface and then transported by said roller toward said gap until said cutting edge cuts into the object so that a skin of the object located between said cutting edge and said skin-gripping surface passes into said gap; a holder means movably mounted on said frame spaced from said roller and carrying said blade; and resilient means biasing said holder means to move with said blade in such a direction that the width of said gap is reduced whereby in said gap the skin of an object is pressed against said skin-gripping surface so that the skin is transported by said roller through said gap and cut from the remainder of the object.

5. A machine for removing skin from an object comprising, in combination, a frame; a driven roller mounted on said frame for rotation about an axis and having a peripheral skin-gripping surface; a flat skinning blade extending substantially in tangential direction relative to said skin-gripping surface and having an edge portion bounded by a cutting edge, said cutting edge extending in axial direction along the length of said roller, said edge portion and said cutting edge being located in close proximity with said skin-gripping surface and forming a gap with the same; a holder means movably mounted on said frame spaced from said roller and carrying said blade; manually operable means connected to said holder means for moving the latter in such a direction that said cutting edge of said blade is displaced in a plane substantially tangential to said peripheral skin-gripping surface; and resilient means biasing said holder means to move said blade in any displaced position toward said peripheral skin-gripping surface whereby in said gap the skin of an object is pressed against said skin-gripping surface so that the skin is transported by said roller through said gap and cut from the remainder of the object.

6. A machine for removing skin from an object comprising, in combination, a frame; a driven roller mounted on said frame for rotation about an axis and having a peripheral skin-gripping surface; a flat skinning blade extending substantially in tangential direction relative to said skin-gripping surface and having an edge portion bounded by a cutting edge, said cutting edge extending in axial direction along the length of said roller, said edge portion and said cutting edge being located in close proximity with said skin-gripping surface and forming a gap with the same; a feeding table having a forward end located adjacent said skin-gripping surface spaced in circumferential direction of said roller from said cutting edge so that an object moved beyond said forward end is first gripped by said skin-gripping surface and then transported by said roller toward said gap until said cutting edge cuts into the object so that a skin of the object located between said cutting edge and said skin-gripping surface passes into said gap; a holder means movably mounted on said frame spaced from said roller and carrying said blade; manually operable means connected to said holder means for moving the latter in such a direction that said cutting edge of said blade is displaced in a plane substantially tangential to said peripheral skin-gripping surface toward and away from said forward end of said feeding table; and resilient means biasing said holder means to move said blade in any displaced position toward said peripheral skin-gripping surface whereby in said gap the skin of an object is pressed against said skin-gripping surface so that the skin is transported by said roller through said gap and cut from the remainder of the object.

7. A machine for removing skin from an object comprising, in combination, a frame; a driven roller mounted on said frame for rotation about an axis and having a peripheral skin-gripping surface; a skinning blade having an edge being located in close proximity with said skin-gripping surface and forming a gap with the same; a holder means carrying said blade; mounting means for mounting said holder means on said frame for pivotal movement about a pivot axis parallel to the axis of said roller, said mounting means including eccentric means for displacing said pivot axis parallel to said axis of said roller; manually operated means for operating said eccentric means so as to adjust the width of said gap during rotation of said roller and pivotal movement of said holder means about said pivot axis; and means biasing said holder means to move with said blade in such a direction that the width of said gap is reduced whereby in said gap the skin of an object is pressed against said skin-gripping surface so that the skin is transported by said roller through said gap and cut from the remainder of the object.

8. A machine for removing skin from an object comprising, in combination, a frame; a driven roller mounted on said frame for rotation about an axis and having a peripheral skin-gripping surface; a skinning blade having an edge portion bounded by a cutting edge, said edge portion and said cutting edge being located in close proximity with said skin-gripping surface and forming a gap with the same; a feeding table having a forward end located adjacent said skin-gripping surface spaced in circumferential direction of said roller from said cutting edge so that an object moved beyond said forward end is first gripped by said skin-gripping surface and then transported by said roller toward said gap until said cutting edge cuts into the object so that a skin of the object located between said cutting edge and said skin-gripping surface passes into said gap; a holder means carrying said blade; mounting means for mounting said holder means on said frame for pivotal movement about a pivot axis parallel to the axis of said roller, said mounting means including eccentric means for displacing said pivot axis parallel to said axis of said roller; manually operated means for operating said eccentric means so as to adjust the width of said gap during rotation of said roller and pivotal movement of said holder means about said pivot axis; and means biasing said holder means to move with said blade in such a direction that the width of said gap is reduced whereby in said gap the skin of an object is pressed against said skin-gripping surface so that the skin is transported by said roller through said gap and cut from the remainder of the object.

9. A machine for removing skin from an object comprising, in combination, a frame; a driven roller mounted on said frame for rotation about an axis, said roller having circumferential grooves having smooth surfaces and circumferential sets of teeth alternating with said grooves and projecting from the same, said sets of teeth forming together a skin-gripping surface; stripper means having free edge portions located on said smooth surfaces of said grooves, said edge portions being spaced from, and following said cutting edge in the direction of rotation of said roller; a skinning blade having an edge portion bounded by a cutting edge, said edge portion and said cutting edge being located in close proximity with said skin-gripping surface and forming a gap with the same; a holder means movably mounted on said frame spaced from said roller and carrying said blade; and resilient means biasing said holder means to move with said blade in such a direction that the width of said gap is reduced whereby in said gap the skin of an object is pressed against said skin-gripping surface so that the skin is transported by said roller through said gap and cut from the remainder of the object.

10. A machine for removing skin from an object comprising, in combination, a frame; a driven roller mounted on said frame for rotation about an axis, said roller having circumferential grooves having smooth surfaces and circumferential sets of teeth alternating with said grooves and projecting from the same, said sets of teeth forming together a skin-gripping surface; stripper means having free edge portions located on said smooth surfaces of said grooves, said edge portions being spaced from, and following said cutting edge in the direction of rotation of said roller; a skinning blade having an edge portion bounded by a cutting edge, said edge portion and said cutting edge being located in close proximity with said skin-gripping surface and forming a gap with the same; a feeding table having a forward end located adjacent said skin-gripping surface spaced in circumferential direction of said roller from said cutting edge so that an object moved beyond said forward end is first gripped by said skin-gripping surface and then transported by said roller toward said gap until said cutting edge cuts into the object so that a skin of the object located between said cutting edge and said skin-gripping surface passes into said gap, said feeding table being turnably mounted on said frame for turning movement between an operative feeding position, and an inoperative position in which said forward end is farther spaced from said roller; linkage means connecting said table with said stripper means so that said stripper means is in a position in which said free edge portions are spaced from said grooves of said roller when said table is in said inoperative position; a holder means movably mounted on said frame spaced from said roller and carrying said blade; and means biasing said holder means to move with said blade in such a direction that the width of said gap is reduced whereby in said gap the skin of an object is pressed against said skin-gripping surface so that the skin is transported by said roller through said gap and cut from the remainder of the object.

11. A machine as set forth in claim 10 wherein said stripper means includes a stripper shaft; and means for mounting said shaft on said frame and having a slot for removal of said stripper shaft when said stripper means is in said inoperative position.

12. A machine for removing skin from an object comprising, in combination, a frame; a driven roller mounted on said frame for rotation about an axis and having a peripheral skin-gripping surface; a skinning blade having an edge portion bounded by a cutting edge, said edge portion and said cutting edge being located in close proximity with said skin-gripping surface and forming a gap with the same; a holder means carrying said blade; means for mounting said holder means on said frame turnable about an axis parallel to the axis of said roller, and rockable about an axis transverse to the axis of said roller so that one end of said cutting edge can move away from said skin-gripping surface while the other end of said cutting edge moves toward the same; and means biasing said holder means to move with said blade in such a direction that the width of said gap is reduced whereby in said gap the skin of an object is pressed against said skin-gripping surface so that the skin is transported by said roller through said gap and cut from the remainder of the object.

13. A machine for removing skin from an object comprising, in combination, a frame; a driven roller mounted on said frame for rotation about an axis and having a peripheral skin-gripping surface; a flat skinning blade extending substantially in tangential direction relative to said skin-gripping surface and having an edge portion bounded by a cutting edge, said cutting edge located in a plane perpendicular to said blade and passing through said axis, said cutting edge extending in axial direction along the length of said roller, said edge portion and said cutting edge being located in close proximity with said skin-gripping surface and forming a gap with the same; a feeding table having a forward end located adjacent said skin-gripping surface spaced in circumferential direction of said roller from said cutting edge so that an object moved beyond said forward end is first gripped by said skin-gripping surface and then transported by said roller toward said gap until said cutting edge cuts into the object so that a skin of the object located between said cutting edge and said skin-gripping surface passes into said gap; a holder means carrying said blade; means for mounting said holder means on said frame turnable about an axis parallel to the axis of said roller, and rockable about an axis transverse to the axis of said roller so that one end of said cutting edge can move away from said skin-gripping surface while the other end of said cutting edge moves toward the same; and means biasing said holder means to move with said blade in such a direction that the width of said gap is reduced whereby in said gap the skin of an object is pressed against said skin-gripping surface so that the skin is transported by said roller through said gap and cut from the remainder of the object.

14. A machine for removing skin from an object comprising, in combination, a frame; a driven roller mounted on said frame for rotation about an axis, said roller having circumferential grooves having smooth surfaces and circumferential sets of teeth alternating with said grooves and projecting from the same, said sets of teeth forming together a skin-gripping surface; stripper means having free edge portions located on said smooth surfaces of said grooves, said edge portions being spaced from, and following said cutting edge in the direction of rotation of said roller; a flat skinning blade extending substantially in tangential direction relative to said skin-gripping surface and having an edge portion bounded by a cutting edge, said cutting edge being located in a plane perpendicular to said blade and passing through said axis, said cutting edge extending in axial direction along the length of said roller, said edge portion and said cutting edge being located in close proximity with said skin-gripping surface and forming a gap with the same; a feeding table having a forward end located adjacent said skin-gripping surface spaced in circumferential direction of said roller from said cutting edge so that an object moved beyond said forward end is first gripped by said skin-gripping surface and then transported by said roller toward said gap until said cutting edge cuts into the object so that a skin of the object located between said cutting edge and said skin-gripping surface passes into said gap; a holder means movably mounted on said frame spaced from said roller and carrying said blade; and means biasing said holder means to move with said blade in such a direction that the width of said gap is reduced whereby in said gap the skin of an object is pressed against said skin-gripping surface so that the skin is transported by said roller through said gap and cut from the remainder of the object.

15. A machine as set forth in claim 3 including a supporting shaft turnably mounted on said frame; a handle secured to said shaft; said holder means including a hollow shaft turnable about said shaft, said hollow shaft being formed with eccentric bearing bores turnably receiving said supporting shaft so that turning of said handle effects displacement of said blade and adjustment of the width of said gap; and coupling means for connecting said handle with said hollow shaft.

16. A machine as set forth in claim 3 including a supporting shaft turnably mounted on said frame; a handle secured to said shaft; said holder means including a hollow shaft turnable about said shaft, said hollow shaft being formed with eccentric bearing bores turnably receiving said supporting shaft so that turning of said handle effects displacement of said blade and adjustment of the width of said gap, said handle having a position in which said blade is spaced so far from said roller as to be inoperative and in which said coupling means is disengaged, said hollow shaft having a radial slot for removal of said supporting shaft in said position of said handle, and said holder means having a slot for removal of said supporting shaft; and coupling means for connecting said handle with said hollow shaft.

17. A machine as set forth in claim 3 and including a shaft supported on said frame, said holder means including a part having an inner bore receiving said shaft so that said holder means is turnable about said shaft, said inner bore having a center bore portion abutting said shaft and end bore portions normally spaced from said shaft so that one end of said blade can move away and the other end can move toward said skin-gripping surface under the pressure of the cut object with said hollow part and said holder means rocking on said shaft.

References Cited in the file of this patent

UNITED STATES PATENTS

| | | |
|---|---|---|
| 1,138,835 | Bergren | May 11, 1915 |
| 2,455,831 | Townsend | Dec. 7, 1948 |
| 2,522,728 | Townsend | Sept. 19, 1950 |
| 2,539,692 | Hickman et al. | Jan. 30, 1951 |
| 2,590,747 | Birdseye | Mar. 25, 1952 |
| 2,605,495 | Daniels | Aug. 5, 1952 |